Sept. 6, 1960    G. TACQUET    2,951,388
VARIABLE-DIAMETER V-GROOVED PULLEY
Filed April 17, 1958
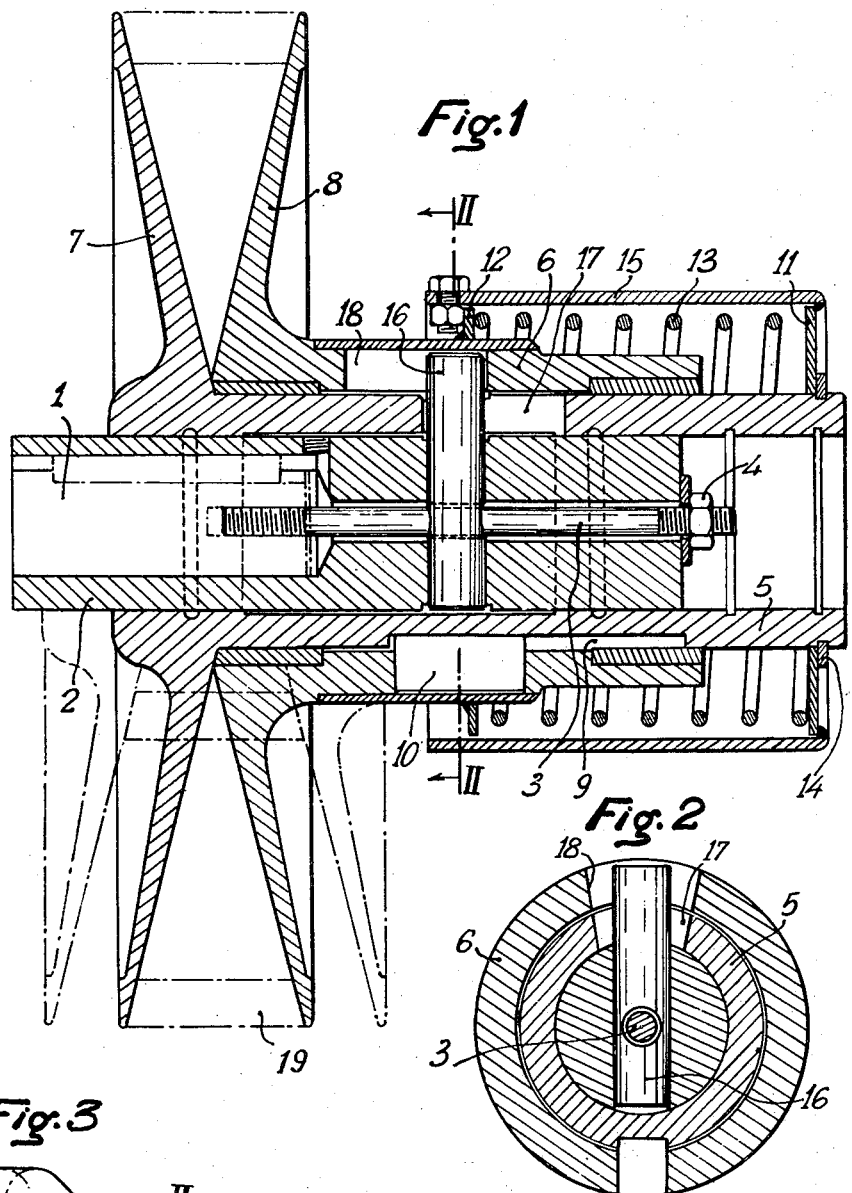
INVENTOR.
Georges Tacquet
Linton + Linton
ATTORNEYS.

United States Patent Office 2,951,388
Patented Sept. 6, 1960

2,951,388
VARIABLE-DIAMETER V-GROOVED PULLEY

Georges Tacquet, Marcz-en-Baroeul, France, assignor to Societe dite: Etablissements Colmant & Cuvelier, Lille, France Filed Apr. 17, 1958, Ser. No. 729,201

Claims priority, application France Dec. 13, 1957

3 Claims. (Cl. 74—230.17)

This invention relates to V-grooved pulleys of the type having a variable effective diameter, wherein the two tapered side walls or flanges of the groove are moved symmetrically toward and away from each other on either side of a fixed transverse plane, these walls being separated automatically by the belt tension and urged toward each other by a return spring.

The numerous devices of this type which have been proposed up to now are not fully satisfactory because the plates carrying the side walls or flanges of the pulley engage the pulley-receiving transmission shaft with bearings of excessively reduced axial length, and as a consequence considerable wear develops in the device and an abnormal clearance occurs very rapidly between the shaft and said plates.

On the other hand, this arrangement leads to a substantial axial dimension and therefore to a considerable overhang constituting a detrimental source of fatigue in the shaft end.

The essential feature of this invention consists in that one of the side plates of the V-grooved pulley is solid with a tubular sleeve adapted to slide axially but not rotatably on an inner, coaxial tubular sleeve solid with the other plate, in that two registering, helical groove-forming apertures are formed in the walls of said tubular sleeves, and that a driving pin carried by the shaft or by a shaft extension extends through these apertures. Moreover, a single return spring surrounds said tubular sleeves between two annular abutment pieces each solid with one of said tubular sleeves.

In order to afford a clearer understanding of this invention and of the manner in which the same may be carried out in the practice, reference will now be made to the accompanying drawing forming part of this specification and illustrating diagrammatically by way of example a typical embodiment of the invention. In the drawing:

Figure 1 is an axial section illustrating the general arrangement of the device;

Figure 2 is a corresponding transverse section taken upon the plane designated in each of the other figures of the drawing by the line II—II;

Figure 3 shows the development of one portion of the outer surface of the outer sleeve, and Figure 4 is a view similar to Figure 3 but showing one portion of the inner surface of the inner sleeve.

On the end portion of a shaft 1 a central socket 2 is secured by means of a screw-threaded axial rod 3 having one end screwed in an axial tapped hole of the shaft, the other end of the rod 3 receiving a fastening nut 4 securing the rod 3 to the central socket 2.

The inner sleeve 5 mounted for axial sliding movement on the central socket and adapted to rotate through a certain angle in relation thereto is solid or integral with a flange or plate 7 formed with a tapered side face constituting one of the inner walls of the groove of the pulley; this flange 7 has slidably mounted thereon another, outer sleeve 6 solid or integral with another flange or plate 8 formed with a tapered side face constituting the other inner wall of the pulley groove. A longitudinal groove 9 formed in the inner sleeve 5 has slidably fitted therein a key 10 solid with the outer sleeve 6, whereby the two sleeves are held against relative rotation. Between an annular abutment piece 11 carried by the sleeve 5 and another annular abutment piece 12 carried by the other sleeve 6, a helical compression spring 13 surrounding both sleeves 5, 6 is disposed and adapted to urge the flanges or plates 7, 8 towards each other. The abutment piece 11 is held in position by a circlips 14 engaging a groove formed in the outer surface of sleeve 5, an outer housing 15 being secured on the abutment piece 11 to protect the spring 13 if desired.

A diametral pin 16 extends through and is solid with the central socket 2; this pin 16 also extends through registering cam-groove forming apertures formed in the two sleeves. The faces of these apertures which are of same direction as the tapered walls of the relevant flanges are designated by the reference numerals 17 and 18; each face 17, 18 constitutes a V-shaped cam face comprising two helical grooves forming an angle of about 45° symmetrically to an axial plane. Moreover, these cam grooves 17, 18 are opposite and contact the generatrices of the diametral pin 16 situated on either side of the transverse plane indicated by the line II—II in the drawing; these cam faces are so arranged that when the flange assembly 7, 8 is rotated in the same direction relative to the central socket 2 equal axial movements of opposite directions are accomplished by these flanges.

This device operates as follows:

Due to the transmission torque, the belt 19 is tensioned and tends to move the flanges 7, 8 away from each other against the pressure of the return spring 13 tending automatically to reduce the effective diameter of the grooved pulley and therefore the transmission ratio until a condition of equilibrium is obtained, whereas the same spring 13 tends to move the flanges 7, 8 towards each other if the belt tension decreases. The position illustrated in thick lines in the drawing corresponds to the minimum relative spacing of the pulley flanges 7, 8 and therefore to the maximum effective diameter of the variable-diameter grooved pulley, the pin 16 being positioned in the bottoms or vertices of the two V-shaped cam grooves 17, 18 formed in the sleeves 5, 6. As the flanges 7, 8 are prevented by the key 10 from rotating relative to each other, they are constantly kept in axial positions that are symmetrical relative to a fixed transverse medial plane II—II, the pin 16 contacting the cam grooves 17, 18 at a variable distance from their vertices consisting of the bottoms of the V-shaped grooves 17, 18.

It will be noted that the concentrical sleeves 5, 6 provide a constant and sufficient bearing surface on the shaft or central socket 2, and that this arrangement is advantageous in that the necessary resilient return action may be exerted very simply by means of a single spring 13 disposed between the annular abutment pieces 11, 12 solid with the flanges 5, 6 respectively on one side of the pulley.

This controlled grooved pulley may be associated with a non-controlled grooved pulley according to the attached drawing to provide a variable-speed transmission between the shafts of the two pulleys with a high ratio between the extreme speeds of the driven element and a constant distance between the axes of these pulleys.

Of course, anybody conversant with the art will readily understand that the form of embodiment shown diagrammatically in the attached drawing should not be construed as limiting the purpose of the invention as many modifications and constructional alterations may be brought thereto without departing from the spirit and scope of the invention as set forth in the appended claims.

I claim:
1. A transmission variable diameter V-grooved pulley comprising a central socket for being connected to one end of a shaft, an inner sleeve rotatably and slidably mounted on said central socket, a first plate having a tapered side face and being fixedly connected to said inner sleeve, an outer sleeve slidably mounted upon said inner sleeve, a second plate having a tapered side face and being fixedly connected to said outer sleeve with said tapered side faces of said first and second plates together forming a V-shaped pulley groove, said inner sleeve having a longitudinal groove, a key fixedly connected to said outer sleeve and slidably positioned within said longitudinal groove for holding said inner and outer sleeves against relative rotation, resilient means mounted on said sleeves urging said plates towards each other and means connecting said sleeves to said socket with said sleeves being capable of rotating through a given angle in relation to said socket and guiding said plates through equal axial movements when said plates are rotating together in the same direction relatively to said central socket.

2. A transmission variable diameter V-grooved pulley comprising a central socket for being connected to one end of a shaft, an inner sleeve slidably and rotatably mounted on said central socket, a first plate having a tapered side face and being fixedly connected to said inner sleeve, an outer sleeve slidably mounted upon said inner sleeve, a second plate having a tapered side face and being fixedly connected to said outer sleeve with said tapered side faces of said first and second plates together forming a V-shaped pulley groove, said inner sleeve having a longitudinal groove, a key fixedly connected to said outer sleeve and slidably positioned within said longitudinal groove for holding said inner and outer sleeves against relative rotation, resilient means comprising a helical spring disposed around said outer sleeve, a pair of abutments respectively and fixedly connected to said inner and outer sleeve with the ends of said spring bearing thereagainst tending to urge said first and second plates towards each other, said inner sleeve having a V-shaped slot, said outer sleeve having a V-shaped slot extending in an opposite direction to said inner sleeve slot, and a pin extending laterally from said socket slidably positioned in said sleeve slots for connecting said sleeves to said socket with said sleeves capable of rotating together through a given angle in relation to said socket and having equal axial movement in opposite directions.

3. A transmission variable diameter V-grooved pulley comprising a central socket for being connected to one end of a shaft, an inner sleeve slidably and rotatably mounted on said central socket, a first plate having a tapered side face and being fixedly connected to said inner sleeve, an outer sleeve slidably mounted upon said inner sleeve, a second plate having a tappered side face and being fixedly connected to said outer sleeve, with said tapered side faces of said first and second plates together forming a V-shaped pulley groove, said inner sleeve having a longitudinal groove, a key fixedly connected to said outer sleeve and slidably positioned within said longitudinal groove for holding said inner and outer sleeves against relative rotation, resilient means mounted on and engaging said sleeves for urging said plates towards each other and guiding means comprising a first elongated aperture in the wall of said inner sleeve, a second elongated aperture in the wall of said outer sleeve, the directions of said first and second elongated aperture forming an acute angle with said angle being symmetrical to an axial plane, a pin mounted transversely on said central socket and extending through said first and second elongated apertures constituting a V-shaped cam-groove for said pin for causing, when said first and second plates are rotating together relatively to said central socket, said first and second plates to rotate through a given angle relative to said socket and have equal axial movements in opopsite directions.

References Cited in the file of this patent
UNITED STATES PATENTS

| 2,276,186 | Getchell | Mar. 10, 1942 |
| 2,711,103 | Miner | June 21, 1955 |
| 2,751,790 | Ingold | June 26, 1956 |

FOREIGN PATENTS

| 890,541 | France | Nov. 8, 1943 |